(12) United States Patent
Zhang (10) Patent No.: US 6,763,347 B1
(45) Date of Patent: Jul. 13, 2004

(54) INDEXING MANAGEMENT FOR HIERARCHICAL MAIN MEMORY

(76) Inventor: Nick Zhang, 3086 Zion La., San Jose, CA (US) 95132

( * ) Notice: Subject to any disclaimer, the term of this patent is extended or adjusted under 35 U.S.C. 154(b) by 366 days.

(21) Appl. No.: 10/032,782

(22) Filed: Oct. 19, 2001

(51) Int. Cl.$^7$ .............................................. G06F 17/30
(52) U.S. Cl. ......................................................... 707/2
(58) Field of Search ........................................ 707/1, 2

(56) References Cited

U.S. PATENT DOCUMENTS

| | | | | |
|---|---|---|---|---|
| 4,819,160 A | * | 4/1989 | Tanka et al. ................... | 707/4 |
| 5,204,958 A | * | 4/1993 | Cheng et al. ................ | 707/102 |
| 6,128,771 A | * | 10/2000 | Tock et al. .................. | 717/111 |
| 6,212,526 B1 | * | 4/2001 | Chaudhuri et al. ......... | 707/102 |

OTHER PUBLICATIONS

Smith A.. J. "Sequentiality and Prefetching in database Systems" Sep. 1978, AMC Transactions on Database Systems, vol. 3, No. 3, pp. 223–247.*

Han W. S. et al. "Prefetching Based on the Type–Level Access Pattern in Object–Relational DBMSs" 2001, Proceedings of 17$^{th}$ Iternational Conference on Data Engineering, pp. 651–660.*

Architected for Real–Time Data Management; TimesTen's Core In–Memory Database Technology; TimesTen Performance Software; pp. 1–13; Copyright 2001 TimesTen Performance Software; Printed in U.S.A. 2000–01–00152 4/01.

* cited by examiner

Primary Examiner—Jack Choules (57) ABSTRACT

The present invention is a system and method for selectively loading indexes into main memory to improve hierarchical database performance, called hot indexing. The most frequently accessed portions of database contents or indexes are loaded into memory. By not loading the entire database into main memory, the size of the database is not limited by the size of the memory. At the same time, targeting the most frequently accessed portion ensures that the desired database content or index is in the faster main memory as opposed to the slower disk based memory. Moving the entire portion into memory, as opposed to making disk based queries to content, speeds up the entire data mining process dramatically. A synchronization method guarantees that changes made to the portion in main memory are reflected in the more permanent disk-based memory.

43 Claims, 8 Drawing Sheets

INDEXING MANAGEMENT FOR HIERARCHICAL MAIN MEMORY

FIELD OF THE INVENTION

The field of the invention relates to computer databases. More specifically, the invention relates to main memory databases.

BACKGROUND OF THE INVENTION

Traditional database systems, relational or hierarchical, are all disk based. The new trend of main memory relational databases reflects the market demands on high performance database systems. A main memory database system can significantly speed up the system response time, but requires loading all database contents into main memory. However, in most cases, fitting an entire database into main memory is not feasible because of the size limitation of addressable main memory and the prohibitive cost.

Currently, two approaches to managing all the indexes in a database system are used. One approach is to store all indexes on disk and use memory based buffers to keep frequently accessed contents. This approach is for traditional database index management. The problem of this approach is slow response time caused by disk access. Even if some portion of some indexes are buffered, the access methods to those buffered indexes are still disk oriented and CPU utilization cannot be optimized.

A second approach is to store all indexes in memory. This approach is for main-memory database management. Because the entire database, including all indexes, can be loaded into main memory, the database access speed will be significantly improved. However, the problem with this approach is that it requires very large memory space for a realistically sized database. Most of the current hardware platform cannot even support more than 2 gigabytes of main memory because of the 32-bit memory address limitation. Even when 64-bit architecture based machines are available, main memory cost is still prohibitive compared to disk memory cost. Currently, per megabyte cost in main memory is about 200–500 times more expensive than disk.

While some progress has been made in the field of main memory relational databases, little to no progress has been made in applying a hierarchical database model to a main memory database. The data model for a hierarchical database system is a tree or a forest of trees. A tree can be described using a node-labeled approach where a tree contains a set of nodes. A node consists of some form of the identification of the node, and optionally, a set of attributes. A node may contain a list of nodes as its attributes. The list can be ordered or un-ordered. An attribute consists of a name and one or more than one value. A node inside a tree can have a data type. A set of nodes with a certain data type is called a collection. A partition of a hierarchical database is a sub-tree of the database tree or forest.

Figure 1:
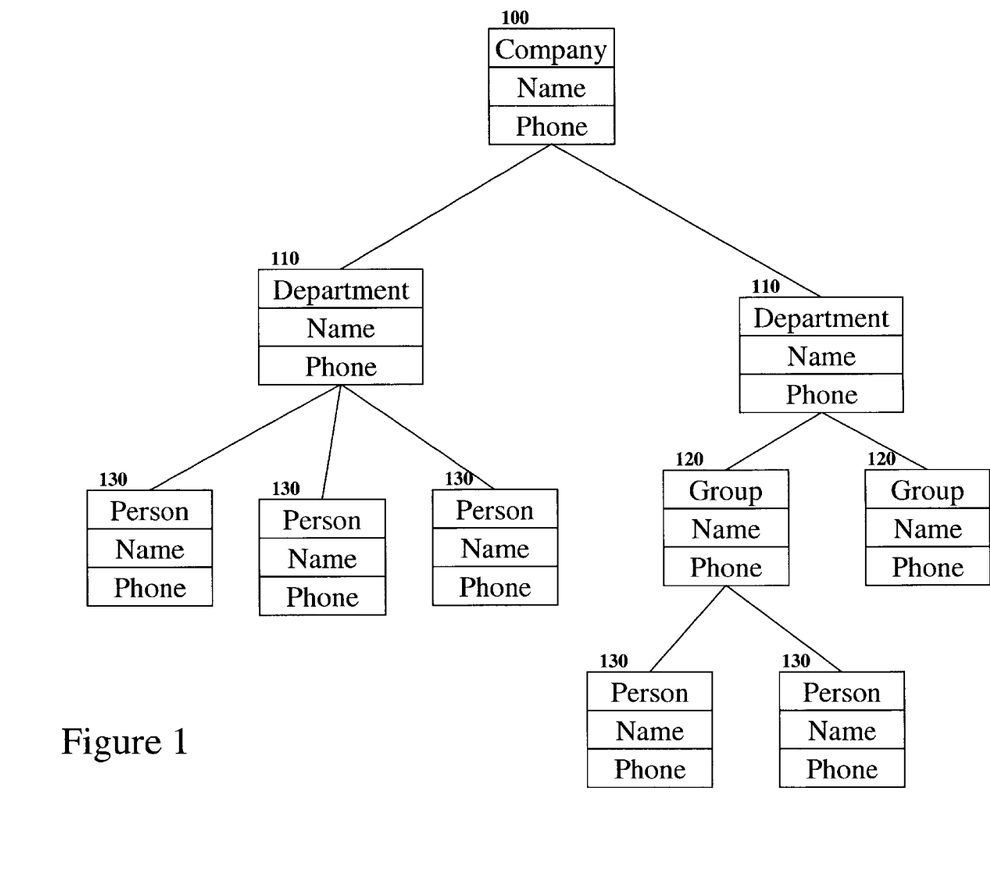
FIG. 1 illustrates in a block diagram a prior art hierarchical database.

An example of a hierarchical database structure is illustrated in FIG. 1. For example, the database could store information about a company's structure. In one embodiment, the first level 100 of the hierarchy contains information about the company, such as name and phone number. The second level 110 contains information about departments within the company 100. The third level 120 contains information about groups within the department 110. The fourth level 130 contains information about either people within the group 120 or, if the departments 110 are not divided into groups, people 130 within the departments 110.

SUMMARY OF THE INVENTION

The present invention is a system and method for selectively loading indexes into main memory to improve hierarchical database performance. The technique is called hot indexing. By hot indexing, only the most frequently accessed portions of database contents or indexes are loaded into memory. Therefore, the size of the database is not limited by the size of the main-memory. At the same time, targeting the most frequently accessed portion ensures that the desired database content or index is in the faster main memory as opposed to the slower disk based storage. Moving the entire portion of selected indexes into main-memory, as opposed to making disk based queries to content, speeds up the entire data access process dramatically. A synchronization method guarantees that changes made to the portion in main memory are reflected in the more permanent disk-based memory.

BRIEF DESCRIPTION OF THE DRAWINGS

The present invention is illustrated by way of example and not limitation in the figures of the accompanying drawings, in which.

DETAILED DESCRIPTION OF THE PREFERRED EMBODIMENT

A system and method for selectively loading indexes into main memory to improve hierarchical database performance is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, circuits, processes and interfaces have not been shown or described in detail in order not to unnecessarily obscure the present invention.

Figure 2:
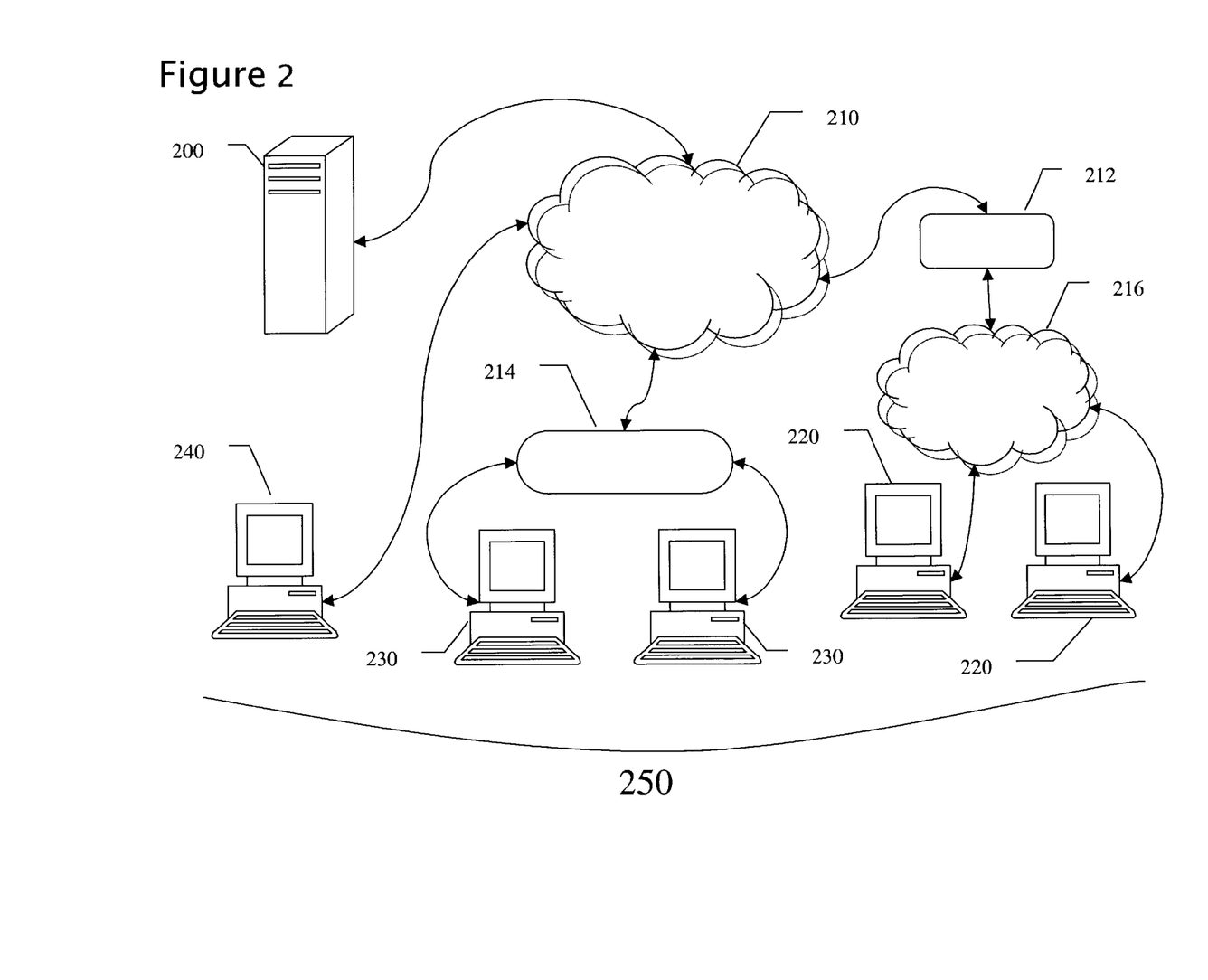
FIG. 2 illustrates a prior art computer network topology and typical network in which the present invention operates.

Referring now to FIG. 2, a diagram illustrates one embodiment of a network environment in which the present invention operates. In this conventional network architecture, a server computer system 200 is coupled to a network 210. In one embodiment, the network 210 is a Local Area Network (LAN). In another embodiment, the network is a Wide-Area Network (WAN) 210, which includes the Internet, or other proprietary networks including America On-Line™, CompuServe™, Microsoft Network™, and Prodigy™, each of which are well known to those of ordinary skill in the art. Wide-area network 210 may include conventional network backbones, long-haul telephone lines, Internet service providers, various levels of network routers, and other conventional means for routing data between computers. Using conventional network protocols, server 200 may communicate through wide-area network 210 to a plurality of client computer systems 220, 230, 240 connected through wide-area network 210 in various ways. For example, client 240 is connected directly to wide-area network 210 through direct or dial up telephone or other network transmission line. Alternatively, clients 230 may be connected through wide-area network 210 using a modem pool 214. A conventional modem pool 214 allows a plurality of client systems to connect with a smaller set of modems in modem pool 214 for connection through wide-area network 210. In another alternative network topology, wide-area network 210 is connected to a gateway computer 212. Gateway computer 212 is used to route data to clients 220 through a local area network (LAN) 216. In this manner, clients 220 can communicate with each other through local area network 216 or with server 200 through gateway 212 and wide-area network 210.

The server computer manages one or more databases stored on one or more data storage devices, such as main memory, hard disk drive, a floppy disk drive, an optical drive, a tape drive or other device. A client computer communicates with a server computer. In one embodiment, the communication uses Internet protocols, such as TCP/IP.

The server computer 200 receives requests from the client computer 250 for performing various database functions and transmits results back to the client computers in response to the requests. Using one of a variety of network connection means, server computer 200 can communicate with client computers 250 using conventional means. In a particular implementation of this network configuration, a server computer 200 may operate as a web server if the World-Wide Web (WWW) portion of the Internet is used for wide area network 210. Using the hypertext transfer protocol (HTTP) and languages such as hypertext markup language (HTML) or extensible markup language (XML) across widearea network 210, the web server 200 may communicate across the World-Wide Web with clients 250. In this configuration, clients 250 use a client application program known as a web browser such as the Netscape™ Navigator™ formerly published by Netscape Corporation of Mountain View, Calif., the Internet Explorer™ published by Microsoft Corporation of Redmond, Wash., the user interface of America On-Line™, or the web browser or HTML/XML translator or any other well-known supplier. Using such conventional browsers and the World-Wide Web, clients 250 may access image, graphical, and textual data provided by the web server 200 or run Web application software. Alternatively, the clients 250 may directly invoke the server side API or network with the server using application specific protocols. In one embodiment the server is accessed using light-weight directory access protocol (LDAP), simple object access protocol (SOAP), Enterprise JavaBeans (EJB) or other protocols and coding language. Conventional means exist by which clients 250 may supply information to the web server 200 through the World-Wide Web 210 and the web server 200 may return processed data to clients 250.

Figure 3A:
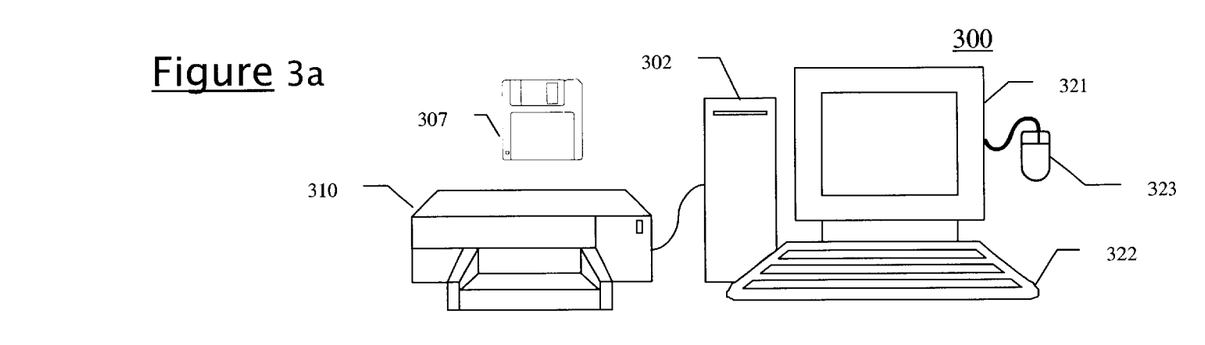
FIG. 3 illustrates the prior art architecture of a conventional computer system useable with the present invention.
Figure 3B:
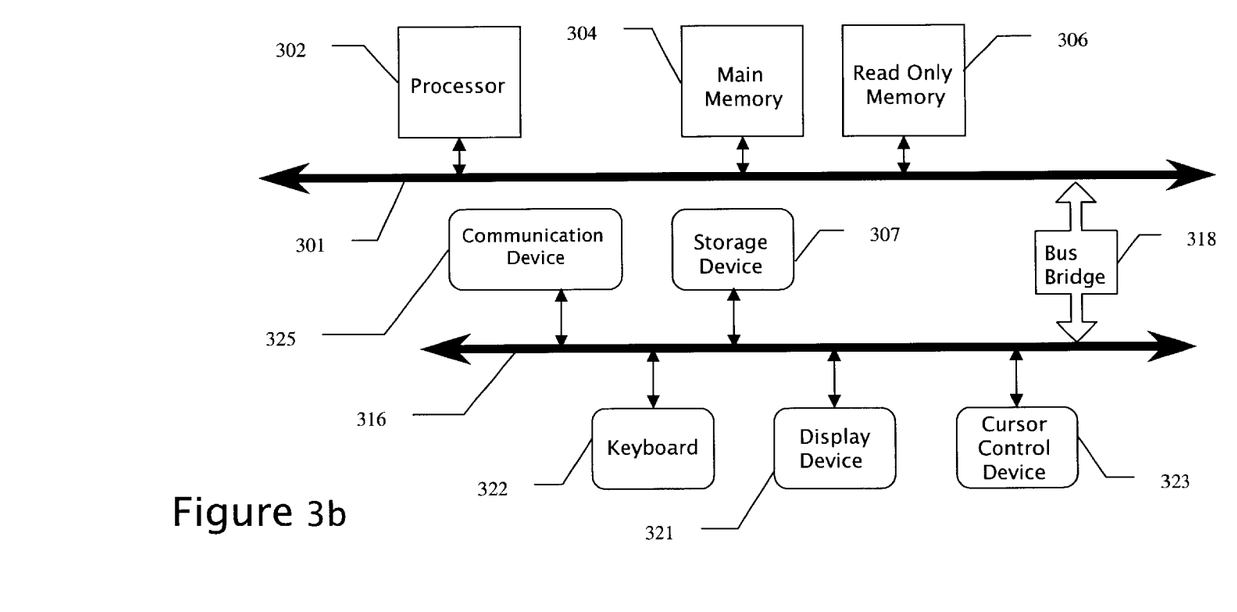

Having briefly described one embodiment of the network environment in which the present invention operates, FIG. 3 illustrates an example of a computer system 300 illustrating an exemplary client 250 or server 200 computer system in which the features of the present invention may be implemented. Computer system 300 is comprised of a bus or other communications means 301 for communicating information, and a processing means such as processor 302 coupled with bus 301 for processing information. Computer system 300 further comprises a random access memory (RAM) or other dynamic storage device 304 (commonly referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and /or other static storage device 306 coupled to bus 301 for storing static information and instructions for processor 302.

An optional data storage device 307 such as a magnetic disk or optical disk and its corresponding drive may also be coupled to computer system 300 for storing information and instructions. Computer system 300 can also be coupled via bus 301 to a display device 321, such as a cathode ray tube (CRT) or a liquid crystal display (LCD), for displaying information to a computer user. For example, image, textual, or graphical depictions of product data and other types of image, graphical, or textual information may be presented to the user on display device 321. Typically, an alphanumeric input device 322, including alphanumeric and other keys, is coupled to bus 301 for communicating -information and/or command selections to processor 302. Another type of user input device is cursor control device 323, such as a conventional mouse, trackball, or other type of cursor direction keys for communicating direction information and command selection to processor 302 and for controlling cursor movement on display 321.

Alternatively, the client 250 can be implemented as a network computer or thin client device, such as the WebTV Networks™ Internet terminal or the Oracle™ NC. Client 250 may also be a laptop or palm-top computing device, such as the Palm Pilot™. Client 250 could also be implemented in a robust cellular telephone, where such devices are currently being used with Internet micro-browsers. Such a network computer or thin client device does not necessarily include all of the devices and features of the above-described exemplary computer system; however, the functionality of the present invention or a subset thereof may nevertheless be implemented with such devices.

A communication device 325 is also coupled to bus 301 for accessing remote computers or servers, such as web server, or other servers via the Internet, for example. The communication device 325 may include a modem, a network interface card, or other well-known interface devices, such as those used for interfacing with Ethernet, Token-ring, or other types of networks. In any event, in this manner, the computer system 300 may be coupled to a number of servers 200 via a conventional network infrastructure such as the infrastructure illustrated in FIG. 2 and described above.

The system of the present invention includes software, information processing hardware, and various processing steps, which will be described below. The features and process steps of the present invention may be embodied in machine or computer executable instructions. The instructions can be used to cause a general purpose or special purpose processor, which is programmed with the instructions to perform the steps of the present invention. Alternatively, the features or steps of the present invention may be performed by specific hardware components that contain hard-wired logic for performing the steps, or by any combination of programmed computer components and custom hardware components. While embodiments of the present invention will be described with reference to the Internet protocols, the method and apparatus described herein is equally applicable to other network infrastructures or other data communications systems.

The present invention is a system and method for selectively loading indexes into main memory to improve hierarchical database performance, called hot indexing. In one embodiment, the most frequently accessed portions of database contents or indexes are loaded into memory. By not loading the entire database into main memory, the size of the database is not limited by the size of the memory. At the same time, targeting the most frequently accessed portion ensures that the desired database content or index is in the faster main memory as opposed to the slower disk based memory. Moving the entire portion into memory, as opposed to making disk based queries to content, speeds up the entire data access process dramatically. A synchronization method guarantees that changes made to the portion in main memory are reflected in the more permanent disk-based memory.

For a hierarchical database, all data can be organized based on data types. A database may contain a list of collections, whereas a collection is a set of data that has the same data types. In order to speed up data access, two kinds of indexes can be built. First, a set of indexes, called structural indexes, is necessary to build tree structure of the database. Second, a set of indexes, called value indexes, is necessary to map node or attributes values to nodes or node identifications. When a node is associated with a unique identifier, the raw database content, including values of all nodes, can be represented as a structural index that maps an identifier to a node. In one embodiment, the whole database content can be regarded as a set of indexes. A basic search or query against a hierarchical database is represented by a path expression with certain search filters or predicates on node or attribute values. The purpose of value indexes is to speed up search and query on specified attributes and values associated with the attributes.

Figure 4:
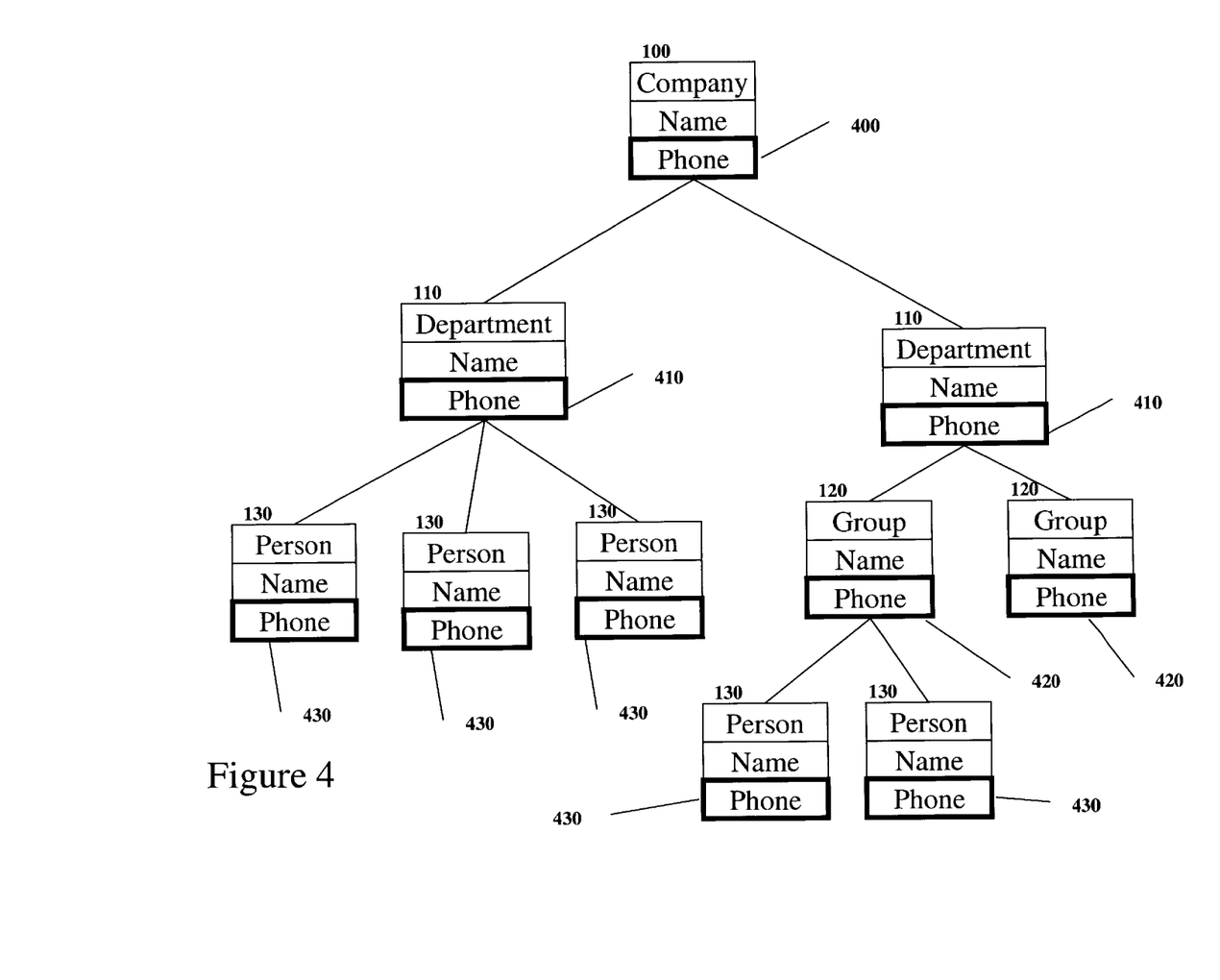
FIG. 4 illustrates in a block diagram the attributes of a hierarchical database.

In one embodiment, the main memory hierarchical database performs attribute hot indexing. In FIG. 4, the hierarchical database of FIG. 1 is used to illustrate attributes indexing. An index contains references to attributes present in the contents of a database.

For example, the company phone number 400, the department phone numbers 410, the group phone numbers 420, and the person phone numbers 430 are contained in an index that maps phone numbers for the company. When an index is identified as hot index, it can be entirely loaded into main memory, where other indexes still reside on slower storage devices such as hard disk. The indexes that reside in main memory can be access using main memory indexing algorithms such as balanced trees and hashing techniques. Therefore, the hot index access can be further sped up.

In one embodiment, a database user specifies which attributes need to be hot indexed based on type information. For every index in the database, a data structure, called index specification, is needed to maintain information about the index. The index specification contains information that indicates whether or not the index is residing in main memory, that is, whether or not the index is hot. The index specification also contains information about what indexing is for, such as full-text, equality, substring, regular expression and other purpose. It also includes policy parameters, such as database access pattern and system load level. In one embodiment, users decide some or all parameters during system initialization process as part of configuration. In another embodiment, users decide some parameters while the system is running. In a further embodiment, the system decides some parameters during runtime. The database access patterns are collected statistically based on database structure, index access frequency, and other runtime information. In a further embodiment, the user specifies which attributes indexes need to reside in main memory, initially or even permanently.

In one embodiment, the database runtime swaps an index into or out of main memory based on the index specification, the index specification containing swapping conditions that the user specifies. In a further embodiment, a set of default swapping conditions is in place until a user specifies otherwise.

In one embodiment, the main-memory hierarchical database performs a combination of partition hot indexing and attribute hot indexing. First, a partition is chosen from the whole database based on partition specification. Then, attribute hot indexing is performed on the chosen partition.

In one embodiment, indexing access methods are provided through an abstract layer so that both memory-based index and disk-based index can be accessed in a unified fashion. The index specification contains implementation information about an indexing access method. In one embodiment, an index specification field specifies whether an index is currently residing in main memory or on disk. If an index has been swapped into or out of the main-memory, a record of this is reflected in the index specification. The index specification also specifies a particular in-memory indexing method if an index resides in memory.

Figure 5:
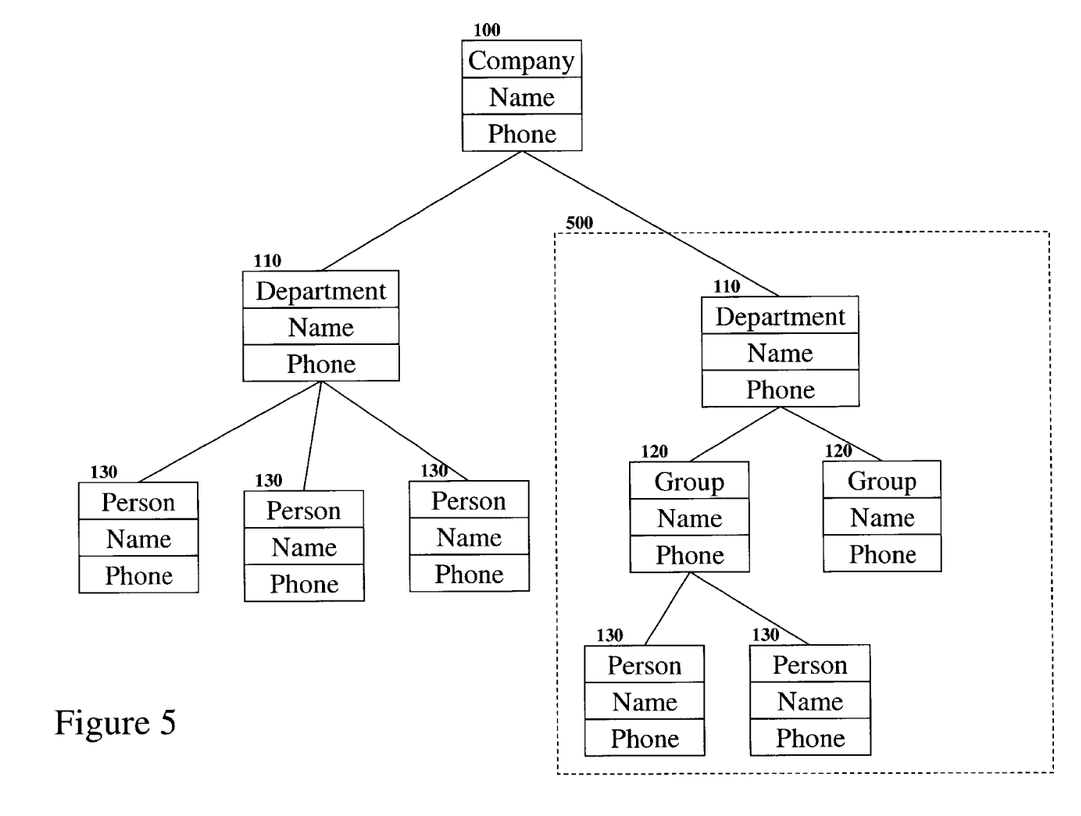
FIG. 5 illustrates in a block diagram a partitioned hierarchical database.

In one embodiment, the main-memory hierarchical database performs partition hot indexing. The database user can specify how to partition a tree or a forest into sub-trees. For example, in FIG. 5, a partition 500 is taken of the company database of FIG. 1. For every partition in the database, a data structure maintains information about the partition. The data structure is called a partition specification. In addition to partition indexing information, the partition specification also contains policy parameters, such as partition access frequency. In one embodiment, the user specifies whether all indexes in a partition are loaded into main memory, initially or permanently. The database runtime swaps a partition index into or out of memory based on the partition specification, the partition specification containing swapping conditions that the user specifies. Whereas attribute hot indexing provides a mechanism that can speed up access to certain attributes across the entire database, the partition hot indexing can speed up access to certain partitions in a hierarchical database.

When a search base or query context falls within a partition specification, the database runtime use all the indexes within this partition specification. When a search base or query context covers multiple partitions, the database runtime will aggregate all involved partition specifications and form joint search or query that consists of a sequence of indexing operations. In one embodiment, if the involved partitions are distributed among multiple machines, the sequence of indexing operations is sent across the distributed system. The database runtime aggregates the search results before returning them to the database user.

Figure 6:
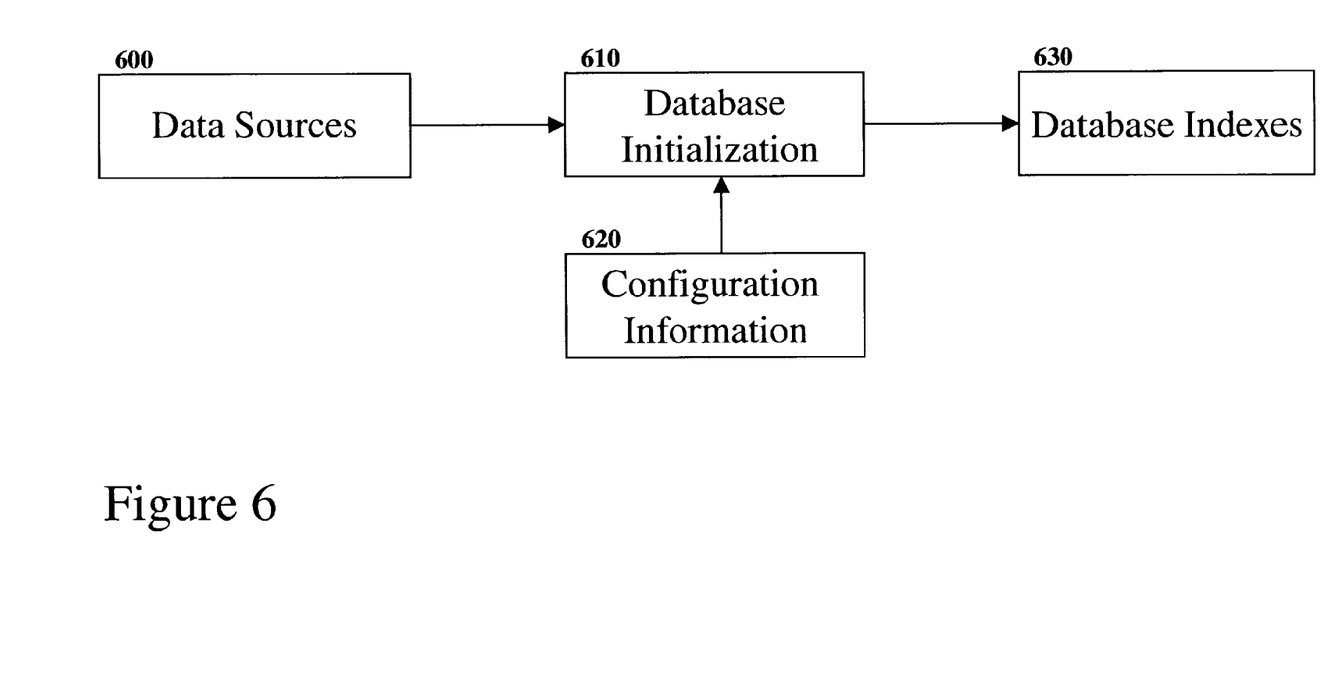
FIG. 6 illustrates in a block diagram the configuration operation for the system.

The database initialization process is illustrated in the block diagram of FIG. 6. The data sources 600 are presented to the database initialization process. The initialization process 610 takes the data sources 600 and configuration parameters 620 to convert the data sources 600 into database index files 630. In one embodiment, the configuration parameters 620 contain information about which indexes to load into main memory and information about partition topology.

Figure 7:
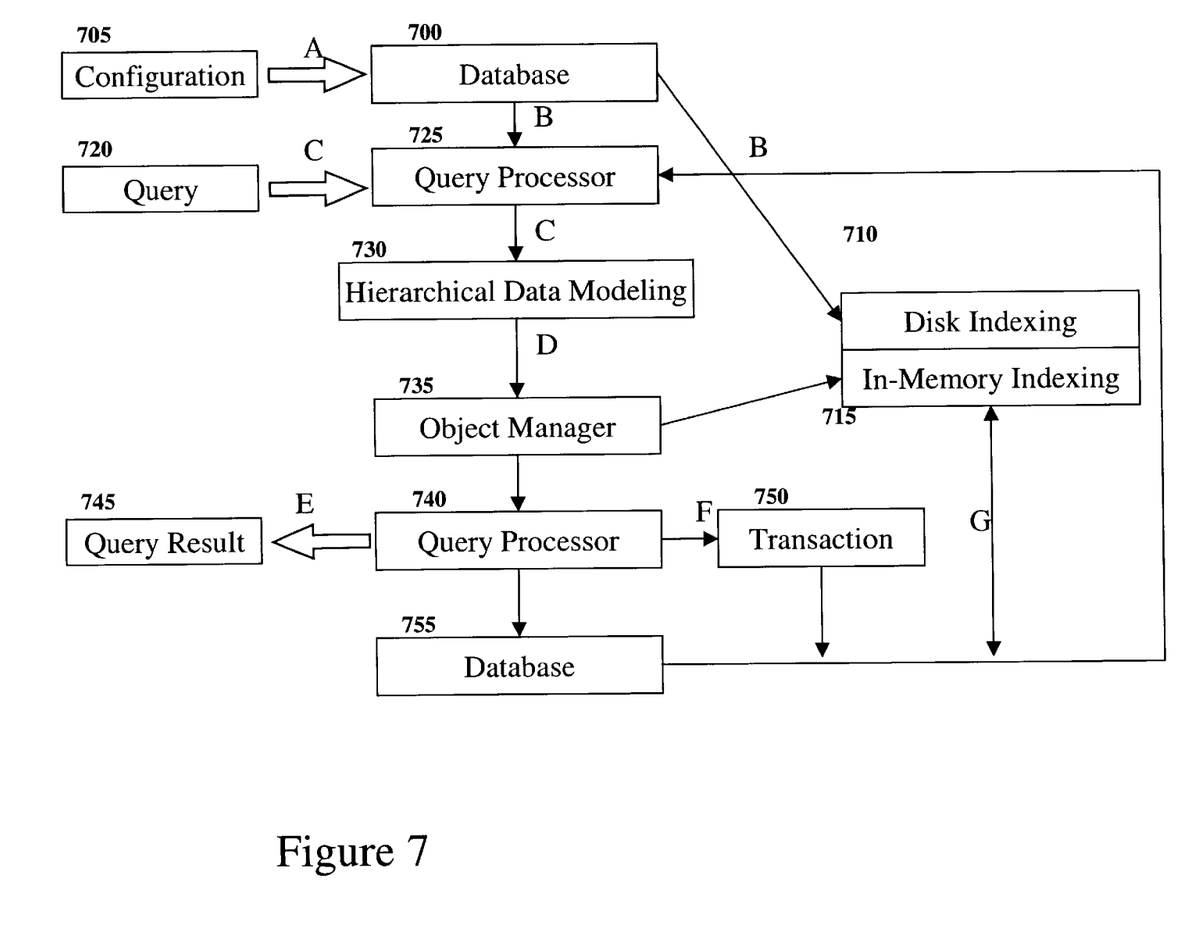
FIG. 7 illustrates in a block diagram a query operation being performed by the system.
Figure 8:
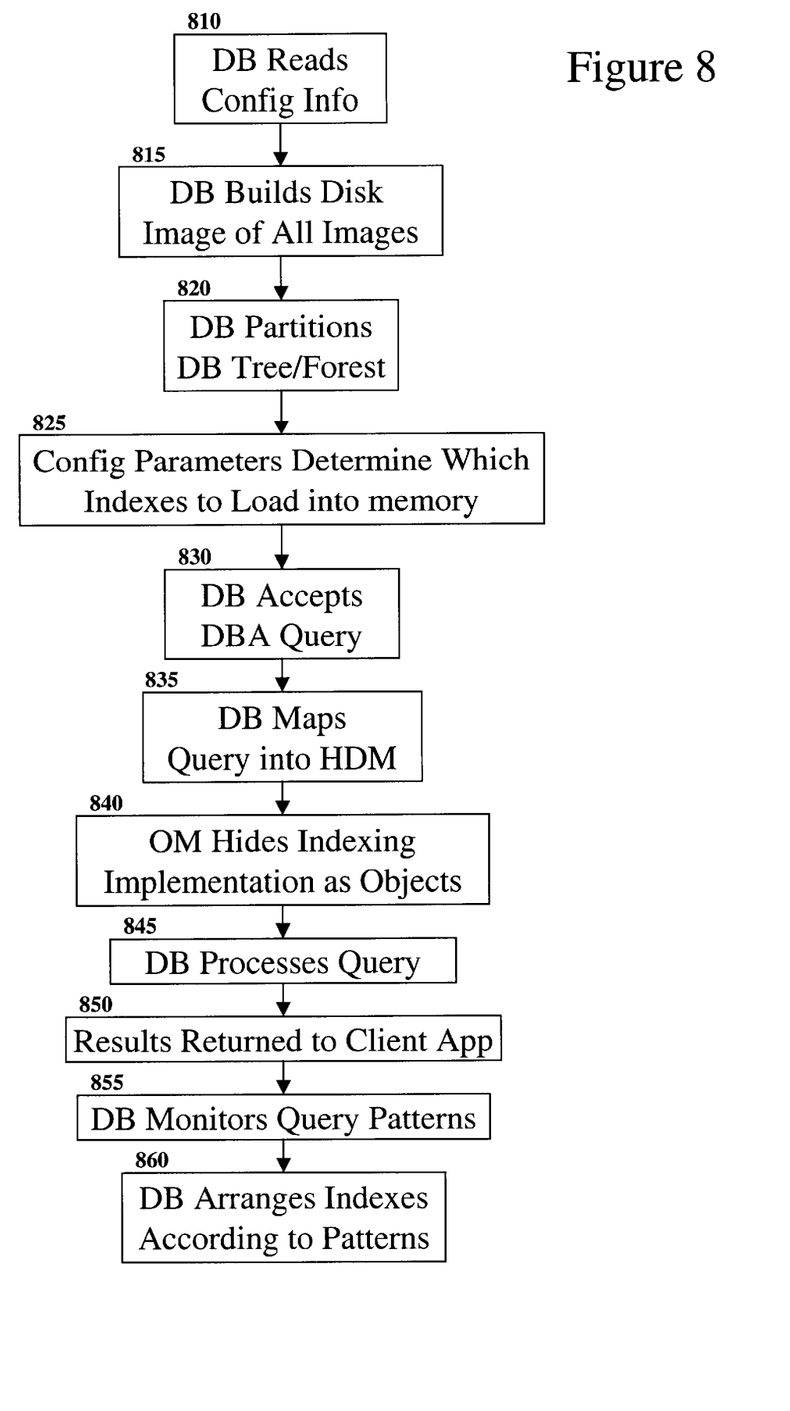
FIG. 8 illustrates in a flowchart a query operation being performed by the system.

The database on-line query operations are illustrated in the block diagram of FIG. 7 and the flowchart of FIG. 8. In block 810 and as shown by arrow A, the database (DB) 700 reads the configuration information 705. In block 815 and as shown by arrow B, the database 700 builds disk image 710 of all indexes. In block 820, the database 700 partitions the database tree or forest. In block 825, the database 700 decides which indexes to load into memory 715 and which ones to stay on the disk 710 based on configuration parameters. In block 830 and arrow C, the database takes a query 720 submitted by database access applications. In block 835, the query processor 725 maps the query into the hierarchical data model (HDM) 730 that is supported by the database 700. The high-level data model treats all objects in the database as object references so that it can directly manipulate objects. In block 840 and arrow D, the object manager (OM) 735 hides the underlying indexing implementation details from the high-level programming application interface. For example, if a requested object is stored on disk 710, the persistence format will be a byte array. The object manager 735 converts from byte arrays into object references and buffers the converted results. In Block 845, the query processor 740 processes the query. In block 850 and arrow E, the query processor 740 returns the result 745 to client applications. In block 855 and arrow F, the query processor 740 gathers the statistical information 750 about the database query patterns, which include database server load level, sub-tree access frequencies, and system resource consumption level. In block 860 and arrow G, the database 755 may swap certain disk indexes 710 into the memory 715 and swap some in-memory indexes out to disk based on the runtime information and user's policy setting.

In one embodiment, when the database has an update operation, the database runtime will decide if the operation is a transactional operation, strong persistent operation, or weak persistent operation, based on the system configuration. If the operation is a transactional operation, the database runtime will guarantee the atomicity of the operation. If the operation is a strong persistent operation and the operation involves indexes residing in main-memory, the runtime will immediately update the disk images of indexes. If the operation is a weak persistent operation, the runtime can hold the update in the main memory until certain conditions are met. In one embodiment, the synchronization of main-memory contents and disk-based contents is conducted on demand. The user demands the hierarchical database system to perform a persistency operation. In another embodiment, the system performs persistency operations based on conditions prescribed by the user. The conditions include timing operations, topology of database hierarchy, or other conditions.

Thus, a database or method from managing a database index is disclosed. Although the present invention is described herein with reference to a specific preferred embodiment, many modifications and variations therein will readily occur to those with ordinary skill in the art. Accordingly, all such variations and modifications are included within the intended scope of the present invention as defined by the following claims.

What is claimed is:

1. A system, comprising:
   a permanent memory storage device containing a hierarchical database; and
   a main memory containing selectively chosen index structures and contents of the hierarchical database, the selectively chosen index structures and contents loaded prior to querying.

2. The system of claim 1, wherein the selectively chosen index structures are chosen based on an attribute.

3. The system of claim 2, wherein a user specifies the attribute at configuration.

4. The system of claim 2, wherein a user specifies more than one attribute at configuration.

5. The system of claim 2, wherein the attribute is chosen at configuration based on statistical preference data.

6. The system of claim 2, wherein a choice of attribute evolves based on user query activities.

7. The system of claim 1, wherein the selectively chosen index structures belong to sub-trees of the hierarchical database.

8. The system of claim 7, wherein a user specifies which sub-trees are loaded into the main memory at configuration.

9. The system of claim 7 wherein the sub-trees are chosen at configuration based on statistical preference data.

10. The system of claim 7, wherein a choice of sub-tree is changed to better suit user query activities.

11. The system of claim 1, wherein alterations to the selectively chosen index structures and contents in the main memory are synchronized with the hierarchical database in the permanent memory storage system.

12. The system of claim 11, wherein the alterations to the selectively chosen index structures and contents in the main memory are simultaneously made to the hierarchical database in the permanent memory storage system.

13. The system of claim 11, wherein the alterations to the selectively chosen index structures and contents in the main memory are made to the hierarchical database in the permanent memory storage system upon completion of the alterations in the main memory.

14. The system of claim 11, wherein the alterations to the selectively chosen index structures and contents in the main memory are made to the hierarchical database in the permanent memory storage system when a prescribed set of criteria have occurred.

15. A method, comprising:
   storing a hierarchical database in a permanent memory storage device; and
   loading selectively chosen index structures and contents of the hierarchical database into a main memory prior to querying.

16. The method of claim 15, further comprising choosing the chosen index structures based on an attribute.

17. The method of claim 16, further comprising allowing a user to specify the attribute at configuration.

18. The method of claim 16, further comprising allowing a user to specify more than one attribute.

19. The method of claim 16, further comprising choosing the attribute at configuration based on statistical preference data.

20. The method of claim 16, further comprising changing the chosen attribute based on user query activities.

21. The method of claim 15, wherein the selectively chosen index structures belongs to sub-trees of the hierarchical database.

22. The method of claim 21, further comprising allowing a user to specify which sub-trees are loaded into the main memory at configuration.

23. The method of claim 21, choosing the sub-trees at configuration based on statistical preference data.

24. The method of claim 21, further comprising changing the chosen sub-tree based on user query activities.

25. The method of claim 15, further comprising synchronizing alterations to the selectively chosen index structures and contents in the main memory with alterations to the hierarchical database in the permanent memory storage system.

26. The method of claim 25, further comprising making the alterations to the selectively chosen index structures and contents in the main memory simultaneous with alterations to the hierarchical database in the permanent memory storage system.

27. The method of claim 25, further comprising making alterations to the hierarchical database in the permanent memory storage system upon completion of making the alterations in the main memory.

28. The method of claim 25, further comprising making alterations to the hierarchical database in the permanent memory storage system when a prescribed set of criteria have occurred.

29. A machine-readable storage medium tangibly embodying a sequence of instructions executable by the machine to perform a method comprising:

storing a hierarchical database in a permanent memory storage device; and loading selectively chosen index structures and contents of the hierarchical database into a main memory prior to querying.

30. The machine-readable storage medium of claim 29, wherein the selectively chosen index structures are value index structures.

31. The machine-readable storage medium of claim 29, further comprising choosing the chosen index structures based on an attribute.

32. The machine-readable storage medium of claim 31, further comprising allowing a user to specify the attribute at configuration.

33. The machine-readable storage medium of claim 31, further comprising allowing a user to specify more than one attribute.

34. The machine-readable storage medium of claim 31, further comprising choosing the attribute at configuration based on statistical preference data.

35. The machine-readable storage medium of claim 31, further comprising changing the chosen attribute based on user query activities.

36. The machine-readable storage medium of claim 29, wherein the selectively chosen index structures belongs to sub-trees of the hierarchical database.

37. The machine-readable storage medium of claim 36, further comprising allowing a user to specify which sub-trees are loaded into the main memory at configuration.

38. The machine-readable storage medium of claim 36, choosing the sub-trees at configuration based on statistical preference data.

39. The machine-readable storage medium of claim 36, further comprising changing the chosen sub-tree based on user query activities.

40. The machine-readable storage medium of claim 29, further comprising synchronizing alterations to the selectively chosen index structures and contents in the main memory with alterations to the hierarchical database in the permanent memory storage system.

41. The machine-readable storage medium of claim 40, further comprising making the alterations to the selectively chosen index structures and contents in the main memory simultaneous with alterations to the hierarchical database in the permanent memory storage system.

42. The machine-readable storage medium of claim 40, further comprising making alterations to the hierarchical database in the permanent memory storage system upon completion of making the alterations in the main memory.

43. The machine-readable storage medium of claim 40, further comprising making alterations to the hierarchical database in the permanent memory storage system when a prescribed set of criteria have occurred.

* * * * *